United States Patent [19]

Kovalenko

[11] 4,377,103
[45] Mar. 22, 1983

[54] DUAL DEPENDENT STORES EJECTOR ASSEMBLY FOR ANGULAR RATE AND POSITION CONTROL

[75] Inventor: Gerald E. Kovalenko, Springfield, Va.

[73] Assignee: The United States of America as represented by the Secretary of the Navy, Washington, D.C.

[21] Appl. No.: 168,987

[22] Filed: Jul. 14, 1980

[51] Int. Cl.³ ............................ B64D 1/04; F41F 5/02
[52] U.S. Cl. ................................ 89/1.5 R; 244/137 R
[58] Field of Search ................ 89/1.5 F, 1.5 R, 1.5 E; 244/137 R; 91/514

[56] References Cited

U.S. PATENT DOCUMENTS

| 2,215,169 | 9/1940 | Beeston | 91/514 X |
|---|---|---|---|
| 2,822,207 | 2/1958 | Steinmetz et al. | 89/1.5 F X |
| 3,610,094 | 10/1971 | Craigie | 89/1.5 F |
| 3,693,350 | 9/1972 | Petro et al. | 60/429 R |
| 3,863,448 | 2/1975 | Purdy | 91/518 X |
| 3,962,954 | 6/1976 | Jacob et al. | 91/518 |
| 3,974,990 | 8/1976 | Holt et al. | 89/1.5 F X |
| 4,043,525 | 8/1977 | Jakubowski | 89/1.5 F X |
| 4,120,233 | 10/1978 | Heiser et al. | 91/511 |
| 4,165,613 | 8/1979 | Bernhoff et al. | 60/420 |
| 4,187,761 | 2/1980 | Holt et al. | 89/1.5 R |

Primary Examiner—David H. Brown
Attorney, Agent, or Firm—R. F. Beers; L. A. Marsh

[57] ABSTRACT

A dual dependent ejector assembly for ordnance stores on aircraft, etc. which imparts to the store, in addition to normal ejecting forces, an angular rate of movement and/or an angular attitude. The ejecting forces are applied at fore and aft locations on the store (e.g. bomb) by piston-like ejectors which are actuated by hydraulic circuitry. Dual dependency is achieved by the action of a stepped piston which transmits equal volumes of fluid from two source chambers to each of the two ejectors. A third chamber in which the stepped piston operates supplements the fluid supplied to the ejectors by the first two chambers by means of a valve distribution system which includes two pressure responsive spool valves.

16 Claims, 3 Drawing Figures

FIG. 3 – RESPONSE CHART

| CASE NO | RELATION-SHIP $F_1, F_2$ | GRAPHICAL REPRESENTATION OF TIME VS. DISPLACEMENT (EJECTOR RESPONSE) | POSITION OF SPOOL 56 | | POSITION OF SPOOL 82 IN CONTROL VALVE 74 | | | | | VALVE STATUS | | | | | LEVER LOCATION | |
|---|---|---|---|---|---|---|---|---|---|---|---|---|---|---|---|---|
| | | | 60 | 62 | 84 | 86 | 88 | 90 | 92 | 118 | 120 | 138 | 140 | 162 | 164 |
| 1 | $F_1 = F_2$ OR $F_1 \neq F_2$ | P4 & P5, Pitch = 0, Angular Rate = 0 | C | O | C | C | O | C | C | C | C | C | C | N/A | N/A |
| 2 | $F_1 = F_2$ OR $F_1 \neq F_2$ | P4, P5, Pitch > 0, Angular Rate = 0 | C | O | O | O | C | O | O | C | O | C | C | N/A | HORIZ OR VERT |
| 3 | $F_1 = F_2$ OR $F_1 \neq F_2$ | P5, P4, Pitch > 0, Angular Rate = 0 | C | O | O | O | C | C | C | O | C | O | O | HORIZ OR VERT | N/A |
| 4 | $F_1 = F_2$ | P4 & P5, Pitch = 0, Angular Rate = 0 | O | C | C | C | C | O | C | O | O | C | C | VERT | VERT |
| 5 | $F_1 > F_2$ OR $F_1 < F_2$ | P4, Pitch > 0, Angular Rate > 0 | O | C | C | O | C | C | C | O | C | C | C | N/A | HORIZ OR VERT |
| 6 | $F_1 > F_2$ OR $F_1 < F_2$ | P5, P4, Pitch > 0, Angular Rate > 0 | O | C | O | O | C | C | O | C | O | C | C | HORIZ OR VERT | N/A |
| 7 | $F_1 > F_2$ $F_1 < F_2$ | If $F_1 > F_2$, P4-P5; If $F_1 < F_2$, P5-P4, Pitch > 0, Angular Rate > 0 | O | C | C/O | O | C | O | C/O | O | O | C | C | N/A | N/A |

DUAL DEPENDENT STORES EJECTOR ASSEMBLY FOR ANGULAR RATE AND POSITION CONTROL

BACKGROUND OF THE INVENTION

The present invention relates to ejector systems for ejecting ordnance stores, e.g. bombs, missiles or other material containers, from an aircraft and more particularly to store ejector systems which are capable of imparting an angular rate of movement or angular attitude to the store as it is ejected.

When a store is released from an aircraft in flight it is necessary to forcibly eject the store away from the flow field developed around the aircraft to prevent a collision with the aircraft, due to upward currents, etc. When the store is forcibly ejected from the aircraft, the store is subjected to various forces which have a profound effect on its flight pattern. One factor which effects the force field during release and the flight pattern of the store after release is the attitude and acceleration of the plane. Another factor which must be considered in order to assure proper projection of the store at the target is the various center of gravity locations in various stores which influence the pitch and pitch rate of the store. Due to various locations of the center of gravities, generally a single ejector is undesirable since the force of the ejector at a position other than the center of gravity will develop a moment. Dual ejectors alleviate this problem, but when utilizing ejectors at the fore and aft positions, it is necessary to synchronize the movement, regardless of force differentials, so as to assure proper pitch or attitude for the store.

It has been found that by utilizing two substantially independent hydraulic circuits having equal fluid volumes and synchronized pistons with substantially equal piston areas, each of the two ejectors will move a proportional amount regardless of whether the force against one ejector is greater than the other. This is generally known in the art as dual dependency. With a dual dependency capability the effect of an offset center of gravity is minimized. At the same time it may be desirable to make the degree of extension of each of the ejectors independently adjustable so that a predetermined pitch may be imparted to the store. An example of a dual dependent system of ejecting stores with independent adjustments of the degree of ejector extension for pitch control is found in U.S. Pat. No. 3,974,990 to Holt et al. The system disclosed in Holt et al consists of two hydraulic ejector assemblies which are synchronized and operated from a pressurized gas power system output piston. Pitch attitude and pitch rate control are achieved through the use of floating pistons within accumulating cylinders which have adjustable stops to vary the volume of fluid detracted from the corresponding ejectors. It is also known in the art that the use of a stepped piston assembly achieves synchronous, independent, hydraulic fluid flow as disclosed in Ser. No. 797,897, now abandoned, filed by Holt et al on May 17, 1977.

Another store ejector device with pitch control is disclosed in U.S. Pat. No. 4,043,525 to Jakubowski wherein an adjustable metering rod is used to apportion fluid between two thruster pistons. In an alternate embodiment, Jakubowski discloses the use of a rotary apportioning device comprising an apertured, rotating cylinder. However, neither of the Jakubowski embodiments is dual dependent since by interconnecting the flow to the two ejectors, a force differential at one of the ejectors will result in increased flow to the opposite ejector and, therefore, an uncertain attitude for the release store.

It can be appreciated by those skilled in the art that both aforementioned patents disclose store release systems with limited variation possible with respect to pitch and pitch rate. In Jakubowski, the flow to each of the two ejector pistons is generally proportional, and in Holt et al the effect of the accumulator cylinders results generally in an incremental delay. In the above described devices, the pitch and pitch rates are generally interdependent as the selection of flow distributions is generally limited. Therefore, there is a general need in the store ejector art for an ejector system with the capability of ejecting stores at a multitude of pitches and pitch rates to accommodate the diverse physical characteristics of various stores so as to insure a safe and predictable flight pattern for the store. Furthermore, there is a general need for a store ejector unit having dual dependency such that an increased resistance incurred by one ejector will not result in more fluid travelling to the opposite ejector, to thereby insure a predictable/repeatable stroke with control of acceleration, stroke time, and end of stroke velocity.

SUMMARY OF THE INVENTION

Accordingly, the present invention provides a safe store ejector unit with dual dependency and is adjustable so as to provide a multitude of settings for both the angle and the angular rate of change for the released store. Dual ejectors at the fore and aft positions on the store are actuated by hydraulic fluid impelled by a 3-step piston movable within three separate chambers. Substantial dual dependency is achieved by the independent circuitry connecting two of the fluid chambers with the corresponding ejectors. Fluid from the third chamber supplements the fluid to the ejectors in accordance with the setting of a distributing means. Hydraulic accumulators are positioned within the circuitry to drain fluid from a corresponding line to achieve an incremental delay effect. Valve means is positioned at strategic locations in the circuitry to allocate and discharge the fluid to the ejectors and accumulators, respectively.

OBJECTS OF THE INVENTION

It is therefore an object of this invention to provide a safe, reliable store ejector device.

A further object of the present invention is to provide a store ejector device capable of ejecting the store at a multitude of pitch and pitch rate settings.

Another object of this invention is to provide a store ejector device which has two independent ejector subassemblies, that are substantially dual dependent, so that the force resistance encountered by one of the ejector subassemblies will not result in substantially increased fluid flow to the other ejector subassembly.

Still another object of the present invention is to provide a store ejector device which has a fluid distribution system that allocates varying amounts of fluid to the ejector subassemblies to influence the pitch and pitch rate of the ejected store.

Yet another object of the present invention is to provide a store ejector device which provides a capability to counter or accommodate aerodynamic loads occasioned by the attitude or acceleration of the aircraft with an angular (pitch) rate and/or angle (pitch or attitude) that takes into account the aerodynamic loads acting on the store.

Other objects and many of the attendant advantages of the present invention will be readily apparent as the invention becomes better understood by reference to the following detailed description with the appended claims, when considered in conjunction with the accompanying drawings.

BRIEF DESCRIPTION OF THE DRAWINGS

FIG. 3 is a tabular description showing pitch and pitch rate possibilities at various valve and lever settings.

DESCRIPTION OF THE PREFERRED EMBODIMENT

Figure 1:
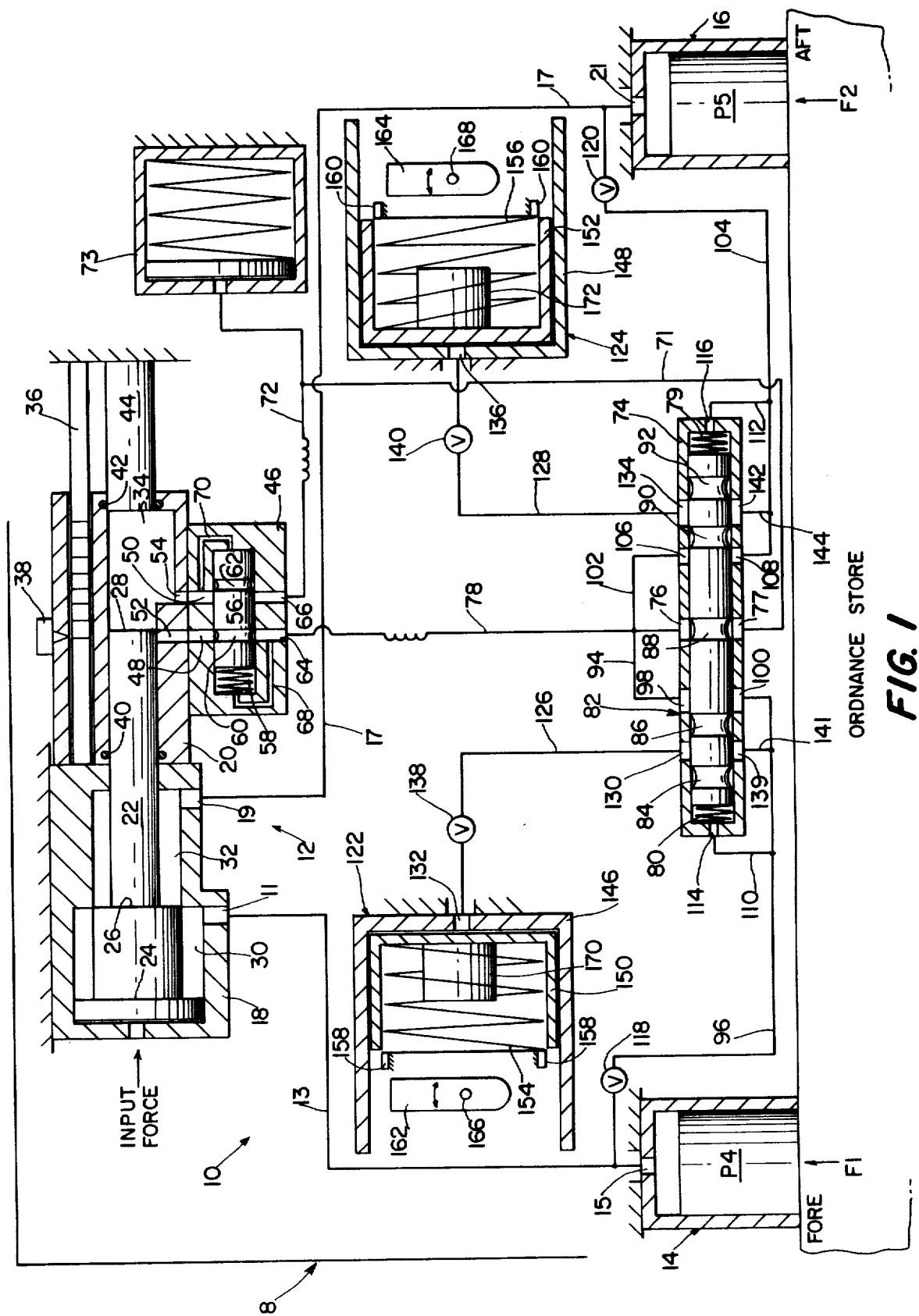
FIG. 1 is a schematic representation of the dual ejector assembly depicting the position of the subassemblies prior to ejection of a store, with the adjustable chamber mechanism being in one of the end positions.
Figure 2:
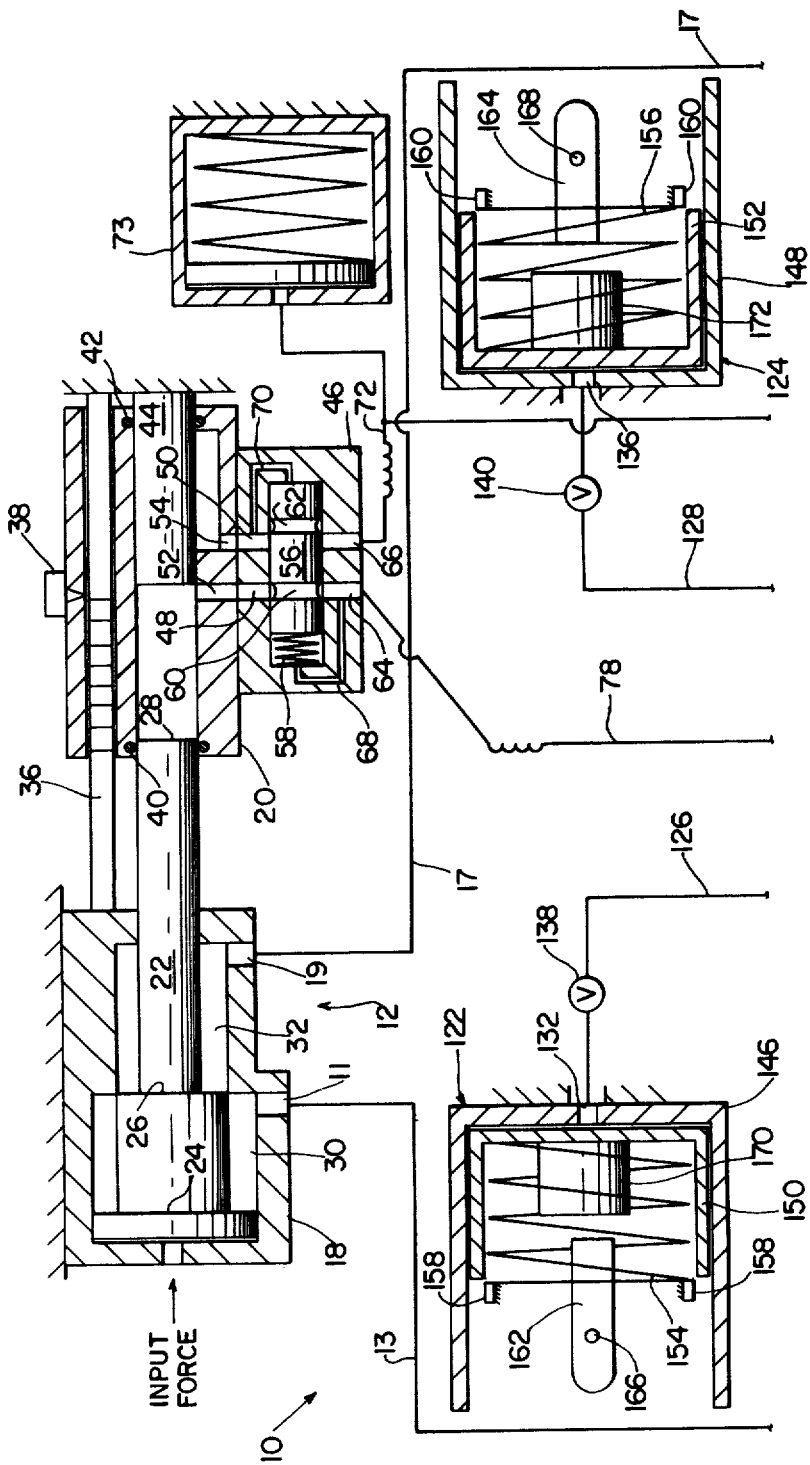
FIG. 2 is a partial schematic representation of the dual ejector assembly of FIG. 1 depicting the adjustable chamber mechanism as being in the other of the end positions and the adjustable accumulator subassemblies having the adjustable abutments pivoted to horizontal positions.

Referring now to the drawings, wherein like reference characters designate like or corresponding parts throughout the several views, the preferred embodiment of FIG. 1 shows a representative store carriage means 8 for removably carry the stores on the aircraft and a dual dependent store ejector assembly 10 comprising a fluid source subassembly 12, a fore ejector subassembly 14, and an aft ejector subassembly 16. Connecting line 13 connects fluid source subassembly 12 to ejector subassembly 14 at respective ports 11, 15, while connecting line 17 connects fluid source subasembly 12 to ejector subassembly 16 at respective ports 19, 21. Note of course that the subassemblies 12, 14 and 16 are mere representations of actual subassemblies which function in a like manner, and the size is not drawn to scale. Fluid source subassembly 12 responds to an input force which may be a highly pressurized gas source which is activated by a cartridge or the like when the release of the store, e.g. bomb, is desired. Fluid source subassembly 12 includes a stationary housing 18 and an axial movable housing 20 in which stepped piston 22 travels. Stepped piston 22 includes piston surfaces 24, 26, 28 which travel within chambers 30, 32, 34, respectively. Although first and second chambers 30 and 32 are fixed with constant volumes, the third chamber 34 has a somewhat variable volume which is adjusted by movement of axially movable housing 20 along axial support 36 by means of a position control means 38 which schematically represents a variety of drive means that are well known to those skilled in the art. For illustration purposes only eight positions are represented on support 36 to which the position control means 38, by means of an appropriate sensing device, may move movable housing 20, from the left end (as illustrated in FIG. 1) to the right end (as illustrated in FIG. 2). Movement of housing 20 also changes the course of the fluid through outlets which are opened and closed by the repositioning, the effect of which will be explained at a later point. As movable housing 20 is adjusted along axial support 36, O-rings 40, 42 engage stepped piston 22 and cylindrical support 44 in sealing fashion so as to allow axial movement yet substantially prevent escape of the working fluid. Control valve housing 46 which moves with movable housing 20 during adjustment is rigidly connected to movable housing 20. Control valve housing 46 is in fluid communication with movable housing 20 through ports 48, 50 which are in alignment with ports 52, 54 respectively. A variety of connectors could be utilized to provide a secure connection including tubular connectors; the arrangement of which would be within the skill of the art. Port 52 is strategically located so that, depending upon the location of movable housing 20, stepped piston 22 substantially blocks the flow of fluid through port 52. Thus while the adjustment of movable housing 20 in the FIG. 1 position precludes fluid flow through port 52 due to blockage by stepped piston 22, the adjustment of movable housing 20 illustrated in FIG. 2 allows flow of the fluid through port 52 until the end of the piston stroke. Likewise, as movable housing 20 is adjusted, cylindrical support 44 operates to block the flow of fluid through port 54, as illustrated in FIG. 2. Hence, the movement of movable housing 20 functions to control the flow of fluid through ports 52, 54 with the location of port 52 in particular also being dependent upon the position of stepped piston 22.

Control valve housing 46 has positioned within it a spool-type valve closure 56 which is resiliently biased to the right as seen in FIGS. 1, 2 by spring 58. Reduced diameter portions 60, 62 provide fluid communication between inlet ports 48, 50 and outlet ports 64, 66 and spool-type valve closure 56 moves in response to pressure in positioning lines 68, 70. Thus, when the pressure of fluid in positioning line 70 exceeds the combination of the force of spring 58 and fluid pressure in line 68, valve closure 56 will move to the left, thereby permitting fluid communication between ports 50, 66 through reduced diameter portion 62. Fluidly connected to outlet port 66 by means of an expansible line 72 is a conventional hydraulic pressure accumulator 73. Line 72 is expansible due to coils or the like so as to permit movement of control valve housing 46 relative to accumulator 73, which is stationary.

Fluid is distributed from control valve housing 46 to ejector subassemblies 14, 16 by the distributing means such as distributing control valve 74 as inlet port 76 is fluidly connected to outlet port 64 by expansible line 78, which, like expansible line 72, has resilient coils or the like to permit the movement of housing 20, 46. Line 72 is in fluid communication with control valve 74 through line 71 which is connected at port 77, located opposite port 76. Movably positioned between coil springs 79, 80 is spool-type valve closure 82 having reduced diameter portions 84, 86, 88, 90, 92 which permit fluid communication between the corresponding ports in distributing valve 74. As illustrated in FIG. 1, fluid travels from line 78 to ejector subassembly 14 through lines 94, 96 when the reduced portion 86 is in alignment with ports 98, 100. Likewise fluid travels from line 78 to ejector subassembly 16 through lines 102, 104 when the reduced portion 90 is in alignment with ports 106, 108. Distributing control valve 74 is responsive to fluid pressures in lines 96 or 104 through positioning lines 110, 112, respectively, which are connected to distributing control valve 74 by means of ports 114, 116, respectively. Thus, as can be readily appreciated by those skilled in the art, fluid pressure in lines 96 will cause valve closure 82 to shift to the right (as seen in FIG. 1) while fluid pressure in line 104 will cause valve closure 82 to shift to the left (as seen in FIG. 1). Passage of fluid from connecting line 13 to line 96 is controlled by regulating means such as valve 118 while a similar regulating means such as valve 120 controls the flow of fluid between lines 17, 104.

Distributing control valve 74 also apportions fluid to adjustable hydraulic accumulators 122, 124 which are connected by lines 126, 128, respectively. Line 126 extends from port 130 in control valve 74 to port 132 in adjustable accumulator 122. Likewise, connecting line 128 extends from port 134 in control valve 74 to port 136 in adjustable accumulator 124. The fluid flow through lines 126, 128 is regulated by valves 138, 140, respectively. Valves 118, 120, 138, 140 are conventional in design and are preferably operated by solenoids (not shown) for quick open and close operation. They may be normally biased to a closed position to diminish the effect of a power failure. It can be seen from FIG. 1, that when valves 118, 138 are open (and assuming fluid pressure in line 104 is dimunitive), fluid pressure in line 110 will cause valve closure 82 to move to the right (as shown in FIG. 1) whereupon reduced diameter portion 84 will allow passage of fluid from port 139 to 130 thereby allowing passage of fluid from line 13 through lines 96, 141, 126 to adjustable accumulator 122. Likewise, when valves 120, 140 are open and fluid pressure in line 110 is dimunitive (i.e. valve 118 is substantially closed), valve closure 82 will shift to the left (as seen in FIG. 1) whereupon reduced diameter portion 92 will align with ports 134, 142 allowing passage of fluid from line 17 through lines 104, 144, 128 to adjustable accumulator 124.

Adjustable accumulators (or reservoirs) 122, 124, both identical in construction, will now be discussed. Positioned within cylindrical housing 146, 148 are floating pistons 150, 152 which are biased by coil springs 154, 156 to the closed position. Fixed positioning means 158, 160, represented schematically in FIGS. 1 and 2, hold coil springs 154, 156 in position. The adjustment means of accumulators 122, 124 includes abutment levers 162, 164 which pivot on axes 166, 168 from a vertical to a horizontal position. Secured to floating pistons 150, 152 are abutments 170, 172. It can be readily appreciated by those skilled in the art that as fluid enters through ports 132, 136 into cylindrical housings 146, 148, floating pistons 150, 152 will recede until abutments 170, 172 contact either the side or end of abutment levers 162, 164, the points of contact being dependent upon the pivoted positions. FIG. 2 shows abutment levers 162, 164 pivoted to the horizontal positions, where the intake fluid volume is minimized. Thus, by controlling the location of levers 162, 164, the amount of fluid entering adjustable accumulators 122, 124 is determined, and since fluid lines 13, 17 are substantially independent in a substantially closed hydraulic system, the amount of fluid detracted from ejector subassemblies 14, 16 is determined. Hence, the position projected by ejector subassemblies 14, 16 may be controlled by movement of abutment levers 162, 164. Such movement may be controlled by a number of conventional pivoting means, which are well known to those skilled in the art, or may be accomplished manually by ground technicians, during the loading of the stores. Thus, the force, velocity, and position of ejector subassemblies 14, 16 may be effectively controlled through the manipulation of position control means 38, valves 118, 120, 138, 140 and abutment levers 162, 164. Since center of gravity and aerodynamic effects are compensated for by the dual dependency of the system, i.e. the independent, controlled volume flow through each of the main flow lines 13, 17, the positioning of the various valves may be done by ground personnel after the type of store is selected in accordance with the location of its center of gravity and flight characteristics. Furthermore, there may be pitch or pitch rate controls in the cockpit which automatically actuate a valve sequence.

Referring now to the valve operation, some examples of the various cases of pitch and/or pitch rate which may be produced are tabulated in FIG. 3. For purposes of interpreting the table, F1, F2 refer to the forces produced by the store against the ejector pistons P4, P5. The displacement "D" refers to the extension distance of the ejector pistons P4, P5 which is roughly plotted in respect to time. Note that in some cases no pitch or angular rate is produced (cases 1 and 4) while in some cases only pitch is produced (cases 2 and 3) and in other cases both a pitch and pitch rate or angular rate is developed (cases 5-7). Looking at the top of the table, the fourth and fifth columns refer to the position of spool 56 in control valve housing 46 as reduced diameter portions 60, 62 are referred to as being in open or closed (O or C) fluid communication. The sixth through tenth columns refer to the location of spool 82 in control valve 74 as reduced diameter portions 84–92 are referred to as being opened or closed. The valve status (opened or closed) is referred to in columns eleven through fourteen for valves 118, 120, 138, 140. Columns fifteen and sixteen refer to levers 162, 164 as being horizontal, vertical or N/A (not applicable or not relevant).

For example, in case number 7, valves 138, 140 are closed so no fluid enters adjustable accumulators 122, 124. Valves 118, 120 are open which will allow fluid to flow to either ejector subassembly 14 or 16 depending on which one is opposing the greater of the forces F1, F2. For example, assume piston P4 is opposing the larger of the two forces. For this condition the pressure in lines 96, 110 will be greater than lines 104, 112 and this will cause valve closure 82 to move to the right (as seen in FIG. 1). When valve closure 82 is in the extreme right position, reduced diameter portion 86 will connect line 94 and line 96 which allows the fluid from chamber 34 to be added to line 13. This will give a counterclockwise angle and angular rate (as seen in FIGS. 1 and 2). If the force reaction is greater at piston P5, valve closure 82 will move at its extreme left position connecting line 102 with line 104. The position of movable housing 20 (which can be adjusted from zero to eight as depicted in FIGS. 1 and 2) will determine the magnitude of angular rate and angle while the position of valve closure 82 (left or right or neutral) will determine if the angle and angular rate is clockwise or counterclockwise (as seen in FIGS. 1 and 2). With valves 138, 140 open and levers 162, 164 set in their respective positions, volume can be subtracted if the magnitude and direction of the angle and angular rate requires a variety of valves.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A variable force, dual ejector for an aircraft weapon stores structure for imparting an angular discharge or angular rate of discharge of the store comprising:

a store carriage means for removably carrying the stores on the aircraft;

first and second fluid actuated ejector means for ejecting the store from the aircraft;

a source of working fluid in effective fluid communication with said ejector means;

said source including means forming three fluid chambers;

a first of said chamber means being in substantially direct fluid communication with said first ejector means and the second of said chamber means being in substantially direct fluid communication with said second ejector means;

first valve means regulating the flow of fluid from the third of said chamber means;

second valve means in fluid communication with said first valve means for distributing the flow of fluid from said third chamber means to said first and second ejector means;

third valve means movable between an open and a closed position for regulating the flow of fluid between said second valve means and said first ejector means;

fourth valve means movable between an open and closed position for regulating the flow of fluid between said second valve means and said second ejector means;

whereby depending upon the positions of said third and fourth valve means, fluid from said third fluid chamber means supplements the flow of fluid to said first and second ejector means to thereby regulate the rate and extent of travel of said first and second ejector means.

2. The invention as claimed in claim 1 wherein said first and second valve means are spool-type control valves.

3. The invention as claimed in claim 1 comprising third accumulator means in fluid communication with said first and second valve means for allowing the accumulation of fluid directed thereto.

4. The invention as claimed in claim 1 wherein said second valve means has a plurality of port means for distributing said working fluid, a first of said port means being in fluid communication with a first accumulator means and a second port means being in fluid communication with a second accumulator means;

whereby depending upon the position of said second valve means fluid may be distributed to said first and second accumulator means through said first and second port means respectively.

5. The invention as claimed in claim 4 further including fifth valve means positioned between said first port means and said first accumulator means and sixth valve means positioned between said second port means and said second accumulator means;

whereby upon the opening of said fifth valve means and the closing of said sixth valve means at least a portion of the fluid initially flowing to said first ejector means will flow into said first accumulator means.

6. The invention as claimed in claim 1 wherein said source of working fluid comprises a stepped cylinder defining said three chamber means, each having a different diameter, and a stepped piston having three distinguishable portions with three corresponding diameters for movement within said stepped cylinder.

7. The invention as claimed in claim 6 wherein two of the three fluid chamber means expel a substantially equal volume of fluid as said piston travels through said cylinder and said third chamber means is adjustable so as to vary the capacity of fluid contained therein.

8. The invention as claimed in claim 7 wherein said third chamber means is movable axially in the direction of travel of said piston to predetermined positions to change the volume defined therein.

9. The invention as claimed in claim 8 wherein said first and second accumulator means comprise means for adjusting the maximum volume of fluid which said accumulator means can accumulate.

10. A variable force, dual ejector for a weapon stores structure adapted to be used in conjunction with a store carriage means on an aircraft for imparting an angular discharge attitude or angular rate of discharge to the store, comprising:

fluid actuated ejector means for ejecting the store from the aircraft;

a source of working fluid in effective fluid communication with said ejector means;

means for fluidly interconnecting said fluid source with said ejector means;

said fluid source including means forming a plurality of distinct fluid chamber means; the flow of fluid from a first of said chamber means adapted to flow primarily to a first of said ejector means and the flow of fluid from a second of said chamber means adapted to flow primarily to a second of said ejector means;

means for distributing the flow of fluid from a third chamber means to said first and second ejector means;

whereby said distributing means allocates the fluid from said third chamber means so as to supplement the flow of fluid to said first and second ejector means.

11. The invention as claimed in claim 10 further including a plurality of adjustable fluid accumulators and wherein said distributing means includes at least two port means, each of said port means being in fluid communication with one of said adjustable fluid accumulators;

whereby said distributing means operates to distribute fluid to said adjustable fluid accumulators.

12. The invention as claimed in claim 10 wherein said distributing means is spool-type control valve which responds to variances in pressures at the ends of the spool.

13. The invention as claimed in claim 10 wherein said fluidly interconnecting means includes first connecting line means for fluid communication between said first chamber means and said first ejector means and a second connecting line means for fluid communication between said second chamber means and said second ejector means; the flow through said first connecting line means being substantially isolated from the flow through said second connecting line means.

14. The invention as claimed in claim 10 wherein said third chamber means is movable with respect to said first and second chamber means and said fluidly interconnecting means includes third connecting line means for fluid communication from said third chamber means to said distributing means;

whereby movement of said third chamber means operates to close said third connecting line means.

15. The invention as claimed in claim 10 further including first and second regulating means respectively associated with said first and second ejector means for controlling the distribution of fluid from said distributing means to said first and second ejector means.

16. The invention as claimed in claims 10 or 15 further including first valve means and accumulator means; said first valve means being operatively located between said third chamber means and said distributing means and being in fluid communication with said accumulator means such that the position of said first valve means apportions the fluid between said distributing means and said accumulator means.

* * * * *